(12) United States Patent
Dooley et al.

(10) Patent No.: US 7,327,311 B2
(45) Date of Patent: *Feb. 5, 2008

(54) METHOD OF DESPREADING GPS SIGNALS

(75) Inventors: Saul R. Dooley, Reigate (GB); Andrew T. Yule, Felbridge (GB)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/084,958

(22) Filed: Mar. 21, 2005

(65) Prior Publication Data

US 2005/0162311 A1 Jul. 28, 2005

Related U.S. Application Data

(63) Continuation of application No. 10/067,366, filed on Feb. 4, 2002, now Pat. No. 6,891,499.

(30) Foreign Application Priority Data

| Feb. 6, 2001 | (GB) | ................... 0102881.0 |
| Feb. 9, 2001 | (GB) | ................... 0103228.3 |

(51) Int. Cl.
*G01S 5/14* (2006.01)
(52) U.S. Cl. .............................. 342/357.02; 342/357.15
(58) Field of Classification Search ........... 342/357.15, 342/357.12
See application file for complete search history.

(56) References Cited

U.S. PATENT DOCUMENTS

| 4,983,980 | A | 1/1991 | Ando ..................... 342/357.15 |
| 5,420,593 | A | 5/1995 | Niles ........................... 342/357 |
| 5,663,734 | A | 9/1997 | Krasner ....................... 342/357 |
| 5,841,396 | A | 11/1998 | Krasner ....................... 342/357 |
| 5,874,914 | A | 2/1999 | Krasner ....................... 342/357 |
| 6,044,105 | A | 3/2000 | Gronemeyer ............... 375/152 |
| 6,067,503 | A | 5/2000 | Yakos ......................... 701/213 |
| 6,133,874 | A * | 10/2000 | Krasner ................. 342/357.15 |

(Continued)

FOREIGN PATENT DOCUMENTS

EP 0 429 769 A2 * 6/1991

(Continued)

OTHER PUBLICATIONS

Povey, Gordon, J.R. et al, "Doppler Compensation and Code Acquisition Techniques for LEO Satellie Mobile Radio Comunications," 5th International Conf on Sat. Systems for Mobile Comm and Navigation, May 1996, pp. 16-19.*

(Continued)

*Primary Examiner*—Gregory C Issing

(57) ABSTRACT

A method of despreading GPS spread spectrum signals containing pseudorandom noise (PRN) code sequences and received by a GPS receiver (24) is disclosed together with a GPS receiver (24) and a mobile communications device (MS1) (especially a mobile cellular telephone) for the same. The method comprises the steps of providing Doppler information relating to an estimate of the variation in Doppler shift as observed on the target signal by the GPS receiver and which is attributable to the motion of the GPS satellite; and correlating the target signal with a reference signal containing corresponding PRN code sequences, wherein, in the course of a single dwell, the correlation is modified as a function of the Doppler information.

7 Claims, 4 Drawing Sheets

U.S. PATENT DOCUMENTS

| | | | | |
|---|---|---|---|---|
| 6,134,262 | A * | 10/2000 | Kitade et al. | 375/142 |
| 6,208,291 | B1 * | 3/2001 | Krasner | 342/357.12 |
| 6,236,673 | B1 * | 5/2001 | Julg | 375/150 |
| 6,331,835 | B1 | 12/2001 | Gustafson et al. | 342/357.06 |
| 6,583,758 | B2 * | 6/2003 | King | 342/357.13 |
| 6,891,499 | B2 * | 5/2005 | Dooley et al. | 342/357.12 |
| 2006/0012515 | A1 * | 1/2006 | Park et al. | 342/357.02 |

FOREIGN PATENT DOCUMENTS

| | | |
|---|---|---|
| EP | 001143674 A2 * | 10/2001 |
| WO | WO 00/13332 A1 * | 3/2000 |
| WO | 0175470 A1 | 10/2001 |
| WO | 0179877 A2 | 10/2001 |

OTHER PUBLICATIONS

Lim, Hyoungsoo et al, "A Simple Carrier Frequency Detection Algorithm for Fine Compensation of Doppler Shift in Direct Sequence Code Division Multiple Access Mobile Satellite Communication," IEEE International Conf on Communications, 6/200 pp. 109-112.

Spillard, Candida L. et al, "A Serial Parallel FFT Correlator For PN COde Acquisition form LEO Satellites," IEEE 5th Internation Symposium on Spread Spectrum Techniques and Applications, Sep. 1998, pp. 446-448.

Povey, Gordon J. R. et al, "Doppler Compensation and Code Acqusition Techniques for LEO Satellite Mobile Radio Communications," 5th International Conf. on Satellite Systems for Mobile Communications and Navigation, May 1996, pp. 16-19.

Cheng, Unjeng et al, "Spread Spectrum Code Acquisition in the Presence of Doppler Shift and Data Modulation," IEEE Trans. on Communications, vol. 38, No. 2, Feb. 1990, pp. 241-250.

"FFT Processing of Direct Sequence Spreading Codes using Modern DSP Microprocessors", by Robert G. Davenport, pp. 98-105.

* cited by examiner

METHOD OF DESPREADING GPS SIGNALS

This is a Continuation of application Ser. No. 10/067,366, filed Feb. 4, 2002 now U.S. Pat No. 6,891,499.

FIELD OF INVENTION

This invention relates to a method of despreading a GPS spread spectrum signal received by a GPS receiver, and to a GPS receiver and a mobile communications device (especially a mobile cellular telephone) incorporating such a GPS receiver for the same.

BACKGROUND TO INVENTION

It is well known to provide a GPS receiver in which replica GPS satellite pseudorandom noise (PRN) code signals are continuous generated and correlated with received GPS signals in order to acquire them. Typically, as the replica codes are likely to have a different code phase to those of the received GPS signals and also a different frequency due to Doppler shift between the receiver and orbiting satellites, a two dimensional code frequency/phase sweep is employed whereby such a sweep will eventually result in the incoming PRN code having the same frequency and code phase as that of the locally generated replica. If detected, the code is acquired and tracked, and the pseudorange information may be retrieved from which the position of the receiver may be calculated using conventional navigation algorithms.

It is further known to provide a mobile cellular telephone incorporating such a GPS receiver for the purpose of enabling operators of cellular telephone networks to determine the location from which a call is made and, in particular, for an emergency call to the emergency services. Of course for an emergency call, it is desirable for the call location to be available as soon as possible, however, from a "cold start" where the GPS receiver does not have access to up to date ephemeris data or even worse from a "factory cold start" where the GPS receiver does not have an up to date almanac, the time to first fix (TTFF) can be anywhere between 30 seconds and 5 minutes.

In order to reduce the TTFF, a GPS receiver may be provided with base station assistance in order to acquire GPS signals more quickly. Such assistance may include the provision by the base station to the receiver of a precision carrier frequency reference signal for calibrating the local oscillator used in the GPS receiver; the data message for up to date satellite almanac and ephemeris data from which Doppler shift for satellites in view can be determined; and the current PRN code phase. With such assistance, it is possible to sweep only a narrowed range of frequencies and code phases in which the target PRN code is known to occupy, thereby reducing the number of code instances that need to be checked and thus reducing the time for code acquisition. Base station assistance is further described in U.S. Pat. Nos. 5,841,396 and 5,874,914 which are incorporated herein by reference.

A substantial reduction in the number of code instances that need to be checked enables an increase in the dwell time for each check without significantly affecting the overall time to acquisition. The benefit of this is that an increase in the dwell time increases the probability of acquiring weak GPS signals. For example, for a single code instance or dwell, correlation may occur over a period of 10 ms, equivalent to approximately 10 PRN code repetitions (C/A mode) or over a period of 100 ms consists of 10 incoherently summed individual correlation periods of 10 ms.

OBJECT OF INVENTION

It is an object of the present invention to provide a method of despreading GPS spread spectrum signals received by a GPS receiver in which the probability of acquiring weak signals is increased and, in particular but not exclusively, when dwells of extended duration are employed to acquire such weak signals.

SUMMARY OF INVENTION

According to the present invention, such a method is provided comprising the steps of providing Doppler information relating to an estimate of the variation in Doppler shift as observed on the target signal by the GPS receiver and which is attributable to the motion of the GPS satellite; and correlating the target signal with a reference signal containing PRN code sequences corresponding to those in the target signal, wherein, in the course of a single dwell, the correlation is modified as a function of the Doppler information. This may occur, for example, by modifying either the target signal or the reference signal as a function of the Doppler information prior to correlation.

By being aware of and compensating for such sources of error, its detrimental effect on the signal acquisition process can be avoided or at least mitigated, thereby aiding in the acquisition of weak GPS signals. This is especially so when very long dwell periods are employed in an attempt to acquire remaining weak signals, for example, 1 s worth of summed individual 10 ms correlations. With a perfect frequency match, in theory one could integrate for an infinite period to acquire an infinitely weak signal. However, the variation in Doppler shift attributable to the motion of the satellite is typically be in the order of 1 Hz per second which, without compensate such Doppler variation, limits the useful integration periods to around 0.5 s (that is ~½ f where f is the frequency variation).

The Doppler shift may be calculated based on a last known position fix of the GPS receiver or alternatively, where the GPS receiver is incorporated in a mobile communications device adapted to communicate with a nearby communications base station, based on a position fix provided by the communications base station. For example, a position fix corresponds to the location of the communications base station.

BRIEF DESCRIPTION OF DRAWINGS

The present invention will now be described, by way of example only, of an embodiment of a mobile cellular telephone comprising a GPS receiver for use in a cellular telephone network with reference to the accompanying schematic drawings in which.

DETAILED DESCRIPTION

Figure 1:
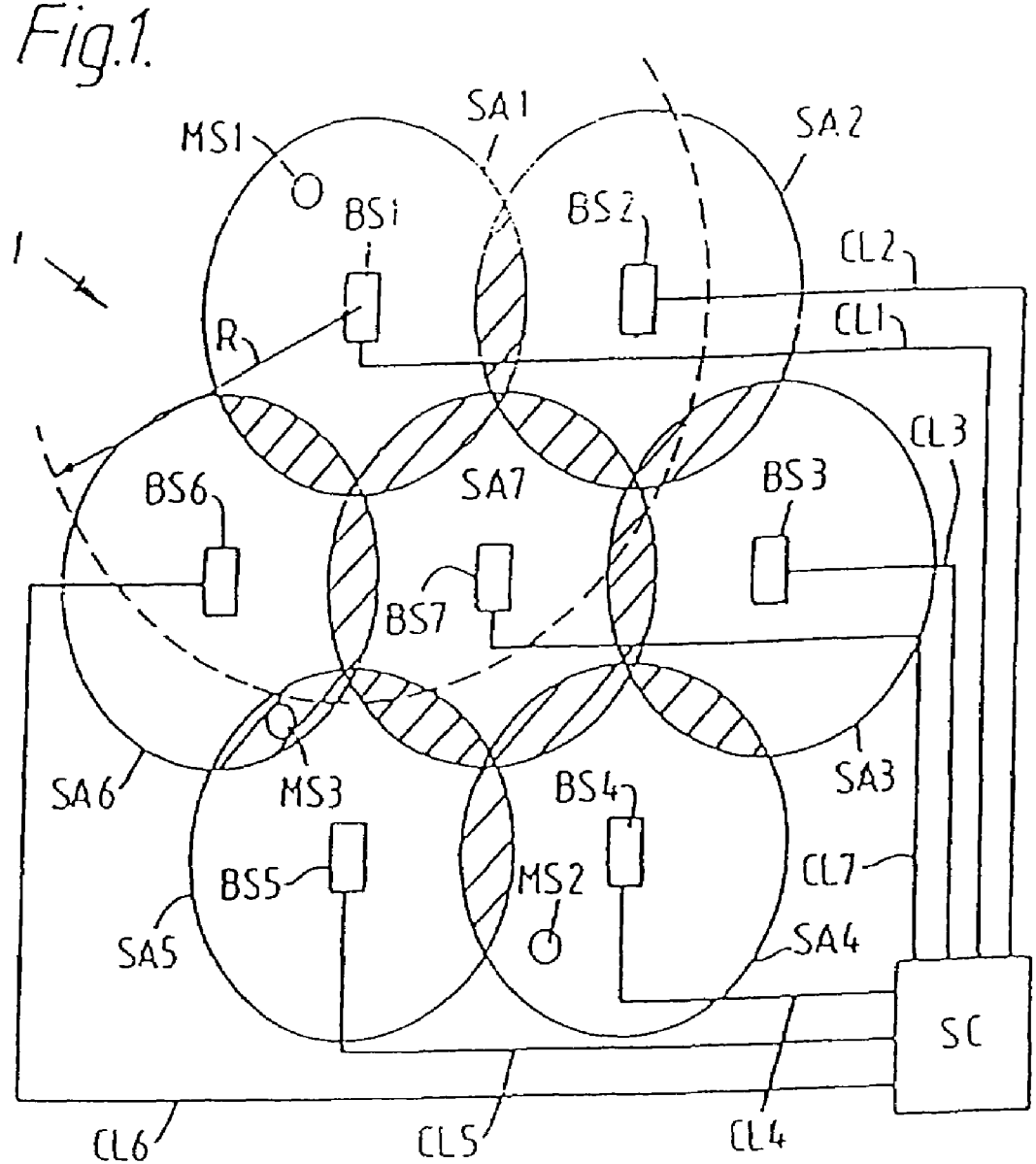
FIG. 1 shows the geographic layout of a cellular telephone network.

The geographical layout of a conventional cellular telephone network 1 is shown schematically in FIG. 1. The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to a the public switched telephone network (PSTN) to enable communication to take place between a mobile cellular telephone MS1 and a subscriber to that network. A plurality of mobile cellular telephones MS are provided of which three, MS1, MS2 and MS3 are shown, each being able to roam freely throughout the whole region, and indeed outside it.

Figure 2:
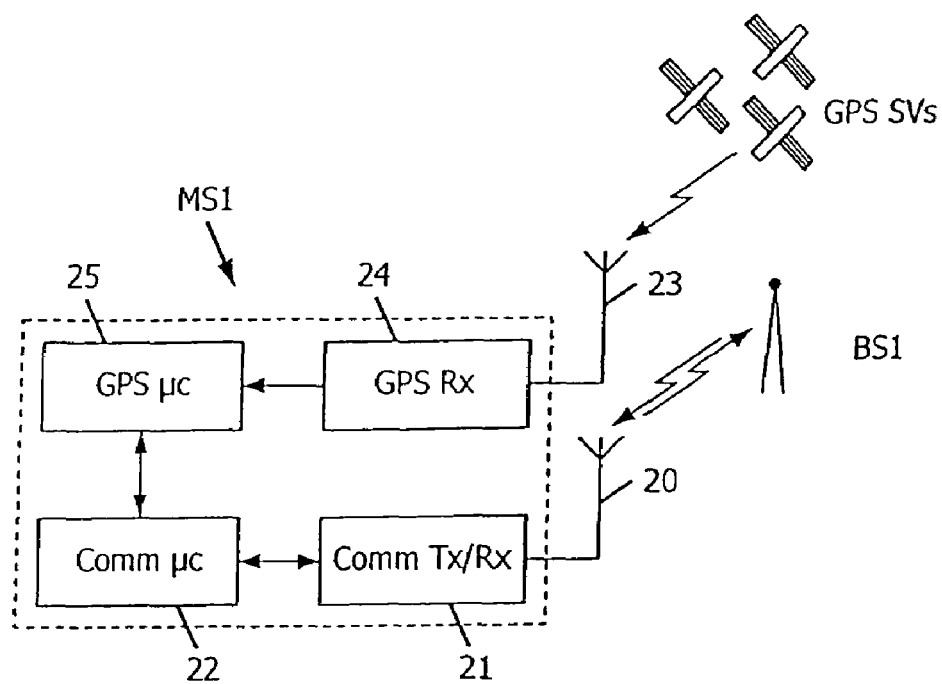
FIG. 2 shows the mobile cellular telephone MS1 of FIG. 1 in greater detail.

Referring to FIG. 2, mobile cellular telephone MS1 is shown in greater detail comprising a communications transmitter (Comm Tx) and receiver (Comm Rx) 21 connected to a communications antenna 20 and controlled by a communications microprocessor (Comm μc) 22 for communication with the base station BS1 with which it is registered. The design and manufacturing of such telephones for two-way communication within a cellular telephone network are well known, those parts which do not form part of the present invention will not be elaborated upon here further.

In addition to the conventional components of a mobile telephone, telephone MS1 further comprises a GPS receiver (GPS Rx) 24 connected to a GPS antenna 23 and controlled by a GPS microprocessor (GPS μc) 25 receiving GPS spread spectrum signals transmitted from orbiting GPS satellites. When operative, the GPS receiver 24 may receive GPS signals through an antenna 23 and pre-process them, typically by passive bandpass filtering in order to minimize out-of-band RF interference, preamplification, down conversion to an intermediate frequency (IF) and analog to digital conversion. The resultant, digitised IF signal remains modulated, still containing all the information from the available satellites, and is fed into a memory of the GPS microprocessor 25. The GPS signals may then be are acquired and tracked in any of several digital receiver channels, typically up to 12, for the purpose of deriving pseudorange information from which the position of the mobile telephone can be determined using conventional navigation algorithms. Such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. The GPS microprocessor 25 may be implemented in the form a general purpose microprocessor, optionally common with the communications microprocessor 22, or a microprocessor embedded in a GPS application specific integrated circuit (ASIC).

Figure 3:
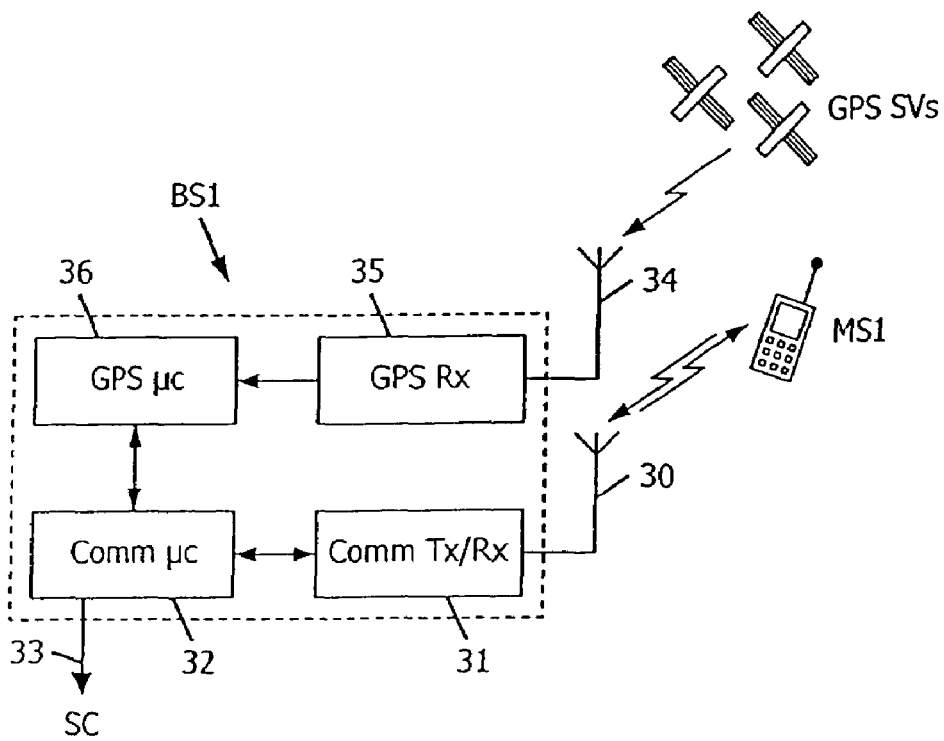
FIG. 3 shows the base station BS1 of FIG. 1 in greater detail.

Cellular telephone network base station BS1 is shown schematically in FIG. 3. In additional to the conventional components of a base station, it further comprises a GPS antenna 34, receiver 35 and microprocessor 36 which are in substantially continual operation whereby the base station is in constant possession of up to date GPS satellite information. This information includes which of the orbiting satellites are presently in view (such satellites are likely to be common to both telephone and associated base station for even macrocells, obscuration aside); the GPS data message containing an up to date almanac and ephemeris data and satellite clock correction data, and the Doppler shift and current code phase of the GPS satellites signals as observed by the base station.

As is known, in the event of the user of the mobile cellular telephone MS1 making an emergency call and under the control of the system controller SC via a two-way communication link CL1, the base station BS1 may provide this information to the telephone whereby it is then only required to sweep a narrowed range of frequencies and code phases in which the target PRN code is known to occupy, ensuring rapid code acquisition and TTFF. A position fix then transmitted back to the base station from the telephone, and then on to the emergency services operator, termed the Public Safety Answer Point (PSAP) in the US.

Figure 4:
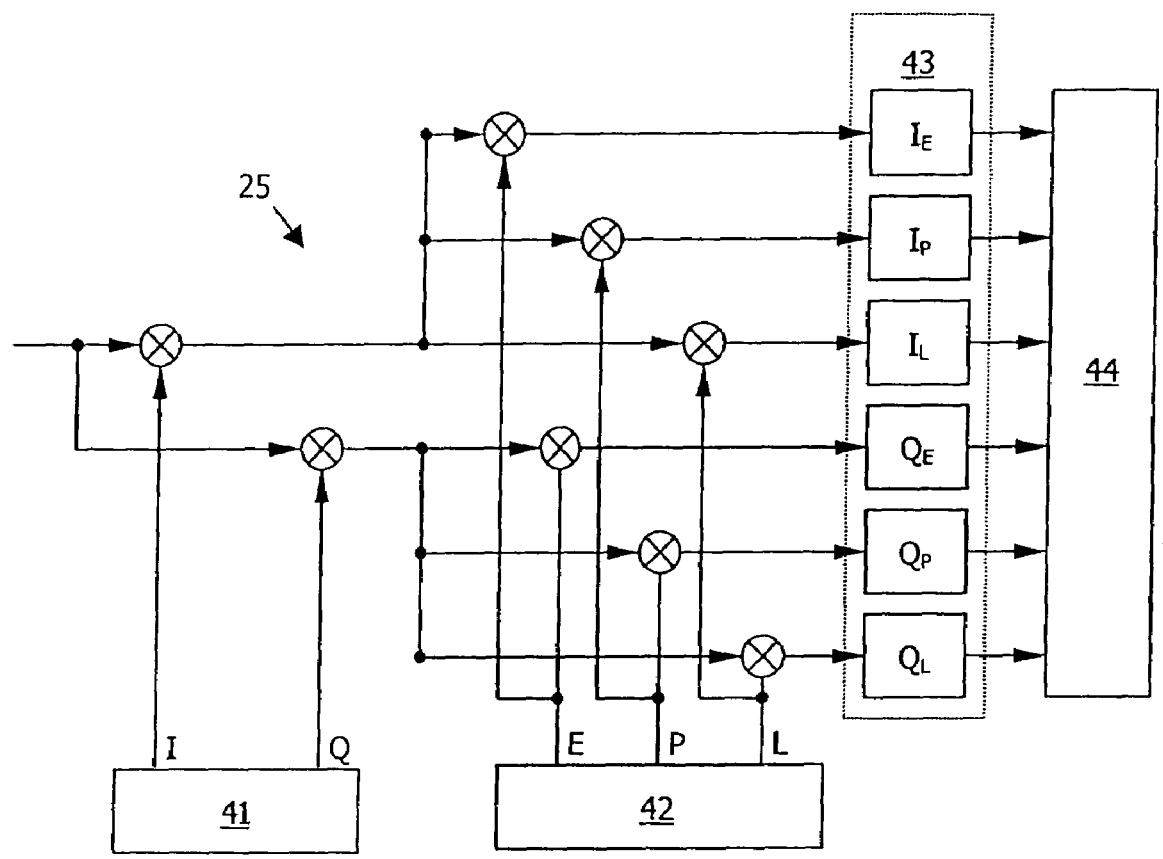
FIG. 4 shows the GPS receiver and processor of the mobile cellular telephone MS1 in greater detail.

Referring to FIG. 4, the GPS microprocessor 25 of the telephone MS1 is shown schematically implementing a pseudorandom noise (PRN) code sweep in which early (E), prompt (P) and late (L) replica codes of satellite PRN codes are continuously generated, and compared to the incoming satellite PRN codes as received by the receiver. In order to retrieve pseudorange information from the signal samples stored in the GPS microprocessor 25, a carrier wave must be removed and this is done by the receiver generating in-phase (I) and quadrature phase (Q) replica carrier wave signals using a carrier wave generator 41. A carrier wave phase lock loop (PLL) is normally employed to accurately replicate the frequency of the received carrier wave. In order to acquire code phase lock, early (E), prompt (P) and late (L) replica codes of the PRN sequences are continuously generated by a code generator 42. The replica codes are then correlated with the I and Q signals to produce three in-phase correlation components ($I_E$, $I_L$, $I_P$) and three quadrature phase correlation components ($Q_E$, $Q_L$, $Q_P$), typically by integration in an integrator 43. A code phase discriminator is calculated as a function of the correlation components and a threshold test applied to the code phase discriminator; a phase match is declared if the code phase discriminator is high and if not, the code generator produces the next series of replicas with a phase shift. A linear phase sweep will eventually result in the incoming PRN code being in phase with that of the locally generated replica and thus code acquisition.

Figure 5:
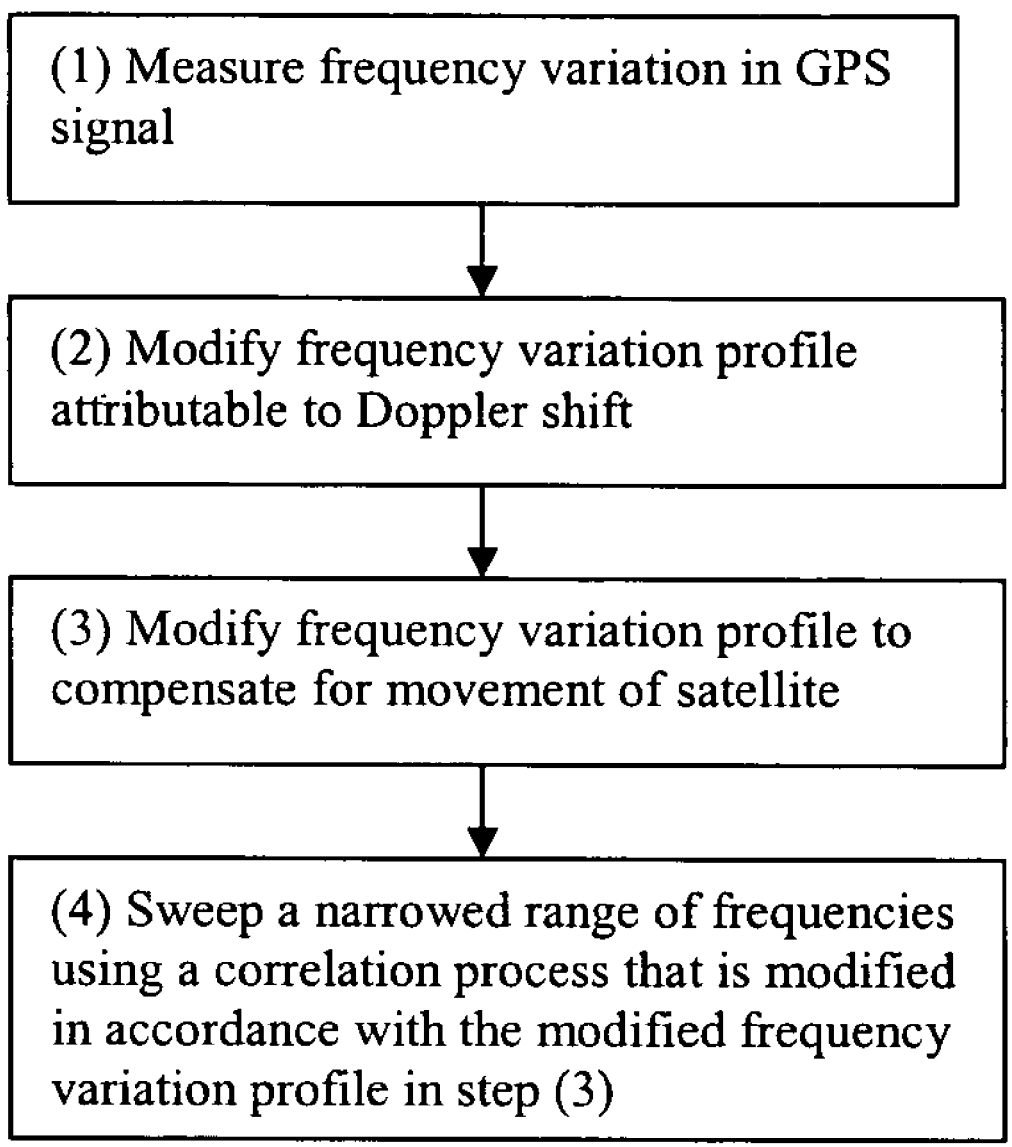
FIG. 5 is a flow chart showing how Doppler information relating to an estimate of a variation in Doppler shift is used to modify a correlation

In accordance with the present invention, the GPS processor 25 of mobile telephone MS1 may acquire incoming GPS signals as illustrated in the following example and FIG. 5,

EXAMPLE

A user of mobile cellular telephone MS1 located inside a building where GPS signal reception is generally poor makes an emergency call to the emergency services (termed "public safety answer point" in the US). Under the control of the system controller SC via a two-way communication link CL1, the base station BS1 provides up to date almanac and ephemeris data, and the Doppler shift of the GPS satellites signals as currently being observed by the base station.

The GPS receiver samples 100 ms of GPS signals and then, using the satellite information provided by the base station, the GPS processor 25 employ a conventional early-minus-late correlation architecture in an attempt to acquire the GPS signals. Using a 10 ms portion of the 100 ms worth of GPS signal sampled, the GPS processor 25 sweeps only a narrowed range of frequencies in which the target PRN code is known to occupy and in doing so manage to acquire two GPS signals having a relatively strong signal-to-noise ratio. This may occur where, for example, the respective GPS satellites are in direct view of the GPS receiver though windows in the building. Then, having completed an unsuccessful sweep for the remaining GPS signals, two further being required to obtain a position fix, the GPS receiver employs a modified acquisition process in which:

(1) Using one of the signals currently acquired, the GPS processor 25 measures the variation in frequency of that signal as observed by the GPS receiver throughout the 100 ms GPS signal sample. This may be done by either repetitively acquiring that signal using several 10 ms dwells throughout the 100 ms sample sequence; or having acquired that signal using an initial 10 ms part of the 100 ms sample sequence, tracking that signal though the 100 ms sample sequence. The variations are typically attributable to local oscillator drift, the reference to which the frequencies are measured by the GPS receiver, and variations in Doppler shift attributable to both handset and satellite movement.

(2) The frequency variation profile may be modified to exclude those frequency variations attributable to Doppler shift caused by the movement of the satellite associated with the acquired signal which can be readily calculated from empheris data provided by the base station or from a previously acquired GPS signal, a position estimate such as one based on a last known position fix or a position fix provided by the communications base station, and a knowledge of GPS time which may be derived from one GPS satellite and a position fix estimate.

(3) To assist in the acquisition of a further GPS signal, the frequency variation profile may be further modified to compensate for expected frequency variations attributable to Doppler shift cause by the movement of the satellite associated with that signal, i.e. the target signal. Again, this may be readily calculated from empheris data provided by the base station or acquired from a GPS signal, a position estimate and knowledge of GPS time.

(4) Using a dwell over the whole 100 ms worth of GPS signal samples, the GPS processor 25 again sweeps only a narrowed range of frequencies in which a target PRN code is known to occupy. This time however, the correlation process employed to acquire that signal is modified in accordance with the frequency variation profile as modified after step (3). That is, the effects of handset movement and local oscillator drift are removed or at least mitigated. This is done in any of the following ways: prior to processing the data in a conventional manner, mixing it with a signal that represents the detected frequency variation; or instead of mixing the data with a fixed frequency offset signal as part of the conventional search mechanism, using a variable frequency signal, adjusted in such a way as to incorporate the measured frequency variation.

In the above example, the variation in Doppler is taken into account during acquisition of relatively weak signals after 2 relatively strong signals have been acquired. Such variation may also be taken into account in order to acquire a first signal when, for example, ephemeris data, an estimate of the position of the mobile telephone and current GPS time is provided to the cellular telephone by a base station.

Furthermore, as an alternative to the early-late correlation method, fast convolution methods and in particular, involving Fast Fourier Transforms (FFTs), may be used in order to acquired the PRN codes. Such convolution methods are described in a paper entitled "FFT processing of direct sequence spreading codes using modern DSP microprocessors" by Robert G Davenport, IEEE 1991 National Aerospace and Electronics Conference NAECON 1991, volume 1, pages 98 to 105, and also in U.S. Pat. No. 5,663,734. The method of the present invention is equally is applicable to such convolution methods at least in that any carrier could be stripped from the signal as described above, before the FFT convolution was carried out.

The invention has largely been described in the context of NAVSTAR GPS, the all weather, spaced based navigation system developed and currently operated by the US Department of Defense. However, it will be appreciated that the general underlying principles of GPS are universal and not merely limited to NAVSTAR. Accordingly, GPS is intended to refer to any positioning system comprising a plurality of spread spectrum radio transmitters at different locations and a receiver which determines its location based on the time of arrival of the transmissions of the radio transmitters.

From a reading of the present disclosure, other modifications will be apparent to the skilled person and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

The invention claimed is:

1. A method of despreading a target GPS spread spectrum signal containing pseudorandom noise (PRN) code sequences and received by a GPS receiver, the method comprising the steps of:
   providing Doppler information relating to an estimate of the variation in Doppler shift as observed on the target signal received by the GPS receiver and which is attributable to the motion of the GPS satellite;
   correlating the target signal with a reference signal containing corresponding PRN code sequences, and
   in the midst of a single dwell, modifying the correlation as a function of the Doppler information to compensate for the variation in Doppler shift in the course of the dwell.

2. A method according to claim 1 wherein the target signal is modified as a function of the Doppler information prior to comparing it with the reference signal.

3. A method according to claim 1 wherein the estimate of the variation in Doppler shift is calculated based on a last known position fix of the GPS receiver.

4. A method according to claim 1 wherein the GPS receiver is incorporated in a mobile communications device adapted to communicate with a nearby communications base station; and wherein the estimate of the variation in Doppler shift is calculated based on a position fix provided by the communications base station.

5. A method according to claim 4 wherein the position fix corresponds to the location of the communications base station.

6. A GPS receiver for despreading a GPS spread spectrum signal received by the GPS receiver comprising:

means for providing Doppler information relating to an estimate of the variation in Doppler shift as observed on the target signal by the GPS receiver and which is attributable to the motion of the GPS satellite;

means for correlating the target signal with a reference signal containing corresponding PRN code sequences, and means for, in the midst of a single dwell, modifying the correlation as a function of the Doppler information to compensate for the variation in Doppler shift in the course of the dwell.

7. A mobile telephone comprising a GPS receiver comprising:

means for providing Doppler information relating to an estimate of the variation in Doppler shift as observed on the target signal by the GPS receiver and which is attributable to the motion of the GPS satellite;

means for correlating the target signal with a reference signal containing corresponding PRN code sequences, and means for, in the midst of a single dwell, modifying the correlation as a function of the Doppler information to compensate for the variation in Doppler shift in the course of the dwell.

* * * * *